US012098029B2

(12) United States Patent
Austrheim

(10) Patent No.: US 12,098,029 B2
(45) Date of Patent: Sep. 24, 2024

(54) ACCESS STATION FOR PICKING STORAGE CONTAINERS

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 772 days.

(21) Appl. No.: 17/283,563

(22) PCT Filed: Oct. 11, 2019

(86) PCT No.: PCT/EP2019/077624
§ 371 (c)(1),
(2) Date: Apr. 8, 2021

(87) PCT Pub. No.: WO2020/074717
PCT Pub. Date: Apr. 16, 2020

(65) Prior Publication Data
US 2021/0339951 A1    Nov. 4, 2021

(30) Foreign Application Priority Data

Oct. 12, 2018  (NO) .................................. 20181318

(51) Int. Cl.
B65G 1/04         (2006.01)
B65G 1/06         (2006.01)
B65G 1/137        (2006.01)
(52) U.S. Cl.
CPC ............. B65G 1/06 (2013.01); B65G 1/0464 (2013.01); B65G 1/1378 (2013.01)

(58) Field of Classification Search
CPC ...... B65G 1/0464; B65G 1/06; B65G 1/1378; B65G 47/96; B65G 47/52; B65G 2207/46
See application file for complete search history.

(56) References Cited

U.S. PATENT DOCUMENTS 4,909,697 A    3/1990  Bernard, II et al.
6,186,725 B1   2/2001  Konstant
(Continued)

FOREIGN PATENT DOCUMENTS

DE    202004010221 Y    8/2004
DE    102011018983-X    10/2012
(Continued)

OTHER PUBLICATIONS

Office Action issued in Chinese Application No. 2019800770248 mailed on May 20, 2022 (9 pages).
(Continued)

Primary Examiner — Thomas Randazzo
(74) Attorney, Agent, or Firm — Baker Botts L.L.P.

(57) ABSTRACT

The invention concerns an access station (3) for picking storage containers (106), comprising: •—a picking zone (4), •—at least one conveyor (8,9,21,22) arranged to transport storage containers (106) from an entry position (6) through said picking zone (4) and to an exit position (7), wherein the access station (3) comprises: •—at least one tilting device (13) arranged to tilt a storage container (106) at least in the picking zone (4). The invention further relates to a method for operating such an access station and an automated storage and retrieval system comprising such an access station.

12 Claims, 9 Drawing Sheets

(56) References Cited

U.S. PATENT DOCUMENTS

| | | |
|---|---|---|
| 7,766,151 B2 | 8/2010 | Schaefer |
| 2011/0203231 A1 | 8/2011 | Hortig |
| 2013/0306434 A1 | 11/2013 | Issing |

FOREIGN PATENT DOCUMENTS

| | | | |
|---|---|---|---|
| JP | 3024732 U | 5/1996 | |
| NO | 317366 B1 | 10/2004 | |
| NO | 20161642A1 Y | 4/2018 | |
| WO | WO 2012/085271 A | 6/2012 | |
| WO | 2014/090684 A1 | 6/2014 | |
| WO | WO2014203126 A | 12/2014 | |
| WO | WO2014203126 A1 | 12/2014 | |
| WO | 2015/193278 A1 | 12/2015 | |
| WO | WO2016198467 A1 | 12/2016 | |
| WO | WO2016198467 Y | 12/2016 | |
| WO | WO 2017/211640 A | 12/2017 | |
| WO | WO 2018/069282-X | 4/2018 | |
| WO | WO-2019238661 A1 * | 12/2019 | ........ B60W 50/0098 |
| WO | WO-2019238664 A1 * | 12/2019 | ........ B60W 50/0098 |

OTHER PUBLICATIONS

ISR dated Jan. 28, 2020.
IPRP dated Jan. 12, 2021.
Search Report of Norwegian Industrial Property Office dated Mar. 10, 2019 Cited inter alia as statement of relevance for any non-english reference cited therein.

* cited by examiner

ACCESS STATION FOR PICKING STORAGE CONTAINERS

TECHNICAL FIELD

The present invention relates to an access station for picking for an automated storage and retrieval system, and a method of operating such an access station.

BACKGROUND AND PRIOR ART

FIGS. 1A and 1C disclose a typical prior art automated storage and retrieval system 1 with a framework structure 100. FIGS. 1B and 1D disclose a prior art container handling vehicle 101 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical, or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a container handling vehicle rail system 108 arranged in a grid pattern across the top of the storage 104, on which rail system 108 a plurality of container handling vehicles 200, 300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105.

The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid 104 disclosed in FIGS. 1A and 1C, Z=8 identifies the lowermost, bottom layer of the grid 104. Consequently, as an example, and using the Cartesian coordinate system X, Y, Z indicated in FIGS. 1A and 1D, the storage container identified as 106' in FIG. 1A can be said to occupy grid location or cell X=10, Y=2, Z=3. The container handling vehicles 101 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column 105, e.g. as is disclosed in WO2014/090684A1.

The rail system 108 may be a single track system, as is shown in FIG. 2A. Alternatively, the rail system 108 may be a double track system, as is shown in FIG. 2B, thus allowing a container handling vehicle 201 having a footprint 202,202' generally corresponding to the lateral area defined by a grid column 112 to travel along a row of grid columns even if another container handling vehicle 200 is positioned above a grid column neighboring that row. Both the single and double track system, or a combination comprising a single and double track arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a,110b of the first rails 110 and a pair of rails 111a,111b of the second set of rails 111. In FIG. 2B the grid cell 122 is indicated by a dashed box.

Consequently, rails 110a and 110b form pairs of neighboring rails defining parallel rows of grid cells running in the X direction, and rails 111a and 111b form pairs of neighboring rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells 122 are arranged in contact with each other such that there is no space there-between.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200,300 can drop off and/or pick up storage containers 106 so that they can be transported to a second location (not shown in the prior art figures) where the storage containers 106 can be accessed from outside of the grid 104 or transferred out of or into the grid 104. Within the art, such a location is normally referred to as a "port" and the grid column in which the port is located may be referred to as a "delivery column" 119,120. The drop-off and pick-up ports of the container handling vehicles are referred to as the "upper ports of a delivery column" 119,120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200,300 can drop off storage containers 106 to be transported through the delivery column 119 and further to an access or a transfer station (not shown in the prior art figures), and the second delivery column 120 may comprise a dedicated pick-up port where the container handling vehicles 200,300 can pick up storage containers 106 that have been transported through the delivery column 120 from an access or a transfer station. Each of the ports of the first and second delivery column 119,120 may comprise a port suitable for both pick up and drop of storage containers 106.

The second location may typically be an access, picking or a stocking station where product items are removed from or positioned into the storage containers 106. In an access, picking or a stocking station, the storage containers 106 are normally never removed from the automated storage and retrieval system 1, but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other), the automated storage and retrieval system 1 comprises a control system (not shown) which typically is computerized and which typically comprises a database for keeping track of the storage containers 106.

As previously mentioned, storage containers are typically brought via delivery columns 119,120 to and from an access station.

In order to efficiently pick goods from storage containers, it is known to provide an access station with a conveyor passing storage containers from delivery columns and through a picking zone. To facilitate ergonomic picking for persons working at the picking zone, it is known from the prior art to have a tilted conveyor at the picking zone where a picking person is working. An example of such prior art is disclosed in U.S. Pat. No. 7,766,151 B2, where a permanently tilted conveyor is arranged in the picking zone of a picking person, and tilting devices are provided on each side of the picking zone to tilt storage containers into or from a tilted position before and after they pass said picking zone. U.S. Pat. No. 7,766,151B2 comprises a conveyor line with a long straight portion passing through a picking zone, which aims to avoid the containers being slowed down in the picking zone. Therefore, the tilting of the containers in U.S. Pat. No. 7,766,151B2 is provided such that the picking person can see the contents of a container in advance of it arriving at the picking zone. A drawback to the solution in U.S. Pat. No. 7,766,151B2 is that it requires a wide area to locate the long straight portion of the conveyor line, which is cumbersome to install and takes up valuable space which is often limited in storage housing.

In view of the above, it is desirable to provide an access station, and an automated storage and retrieval system comprising such an access station that solves or at least mitigates one or more of the aforementioned problems related to the use of prior art access stations.

SUMMARY OF THE INVENTION

The invention is set forth in the independent claims and the dependent claims describe alternatives of the invention.

The invention may in a first aspect relate to an access station for picking storage containers, comprising:
- a picking zone,
- at least one conveyor arranged to transport storage containers from an entry position through said picking zone and to an exit position, wherein the access station comprises:
- at least one tilting device arranged to tilt a storage container at least in the picking zone.

Thus, the access station according to the first aspect provides a solution which is flexible, as it may be operated both with a picking person or a robotic picker. Accordingly, the tilting device may on the one hand tilt a storage container in the picking zone when the access station is to be operated with a picking person, thereby providing the ergonomic benefits of tilting. On the other hand, the tilting device may not tilt storage containers when the access station is to be operated with a robotic picker, thereby allowing a more efficient throughput of storage containers. As robotic picking is only starting to come into use, and certain storage goods are more suited for robotic picking than others, this inventive access station provides a solution which gives optimal efficiency with a robotic picker whilst also allowing for use with a picking person.

Preferably, the tilting device may comprise a tiltable conveyor. However, in some configurations, the tilting device may comprise a platform, frame or rods adapted to tilt a conveyor independent of a conveyor.

Typically, the access station may be covered on its exterior by protective panels, except for:
- the picking zone, which may be defined herein as an area of the access station where storage containers are accessible for picking,
- the entry position, which may be defined herein as an area of the access station where storage containers may be brought into the access station,
- the exit position, which may be defined herein as an area of the access station where storage containers may be brought out of the access station.

However, it is apparent that the entry position and the exit position may be interchangeable, depending on the direction of transport of the storage containers which is determined by the access station's conveyor(s) and external conditions.

The tilting angle range of the tilting device may be from 2° to 60° relative to one or both sides of the pivot axis relative to the horizontal plane, more preferably from 3° to 50°, even more preferably from 4° to 45°, even more preferably from 5° to 40°, even more preferably from 6° to 35°, even more preferably from 7° to 30°, even more preferably from 8° to 25°, even more preferably from 9° to 20°, for example 15°. The tilting device being arranged in the picking zone is thus advantageous as its angle may be adjusted according to the specific needs of a picking person, and the height of the access station from the ground.

The entry position and the exit position may be arranged for connection to at least one storage system conveyor. A storage system conveyor may typically be arranged below a rail system of an automated storage and retrieval system, such that container handling vehicles operating on the rail system may deliver storage containers to the storage system conveyor. The entry position may be connected to a storage system conveyor onto which storage containers are deposited by container handling vehicles, and the exit position may be connected to a storage system conveyor from where storage containers are retrieved by container handling vehicles. In some configurations, the entry position and the exit position may be connected each to a storage system conveyor, where the storage system conveyors are made up of at least one relay module—where storage containers may be deposited and retrieved by storage containers at one location in the relay module.

The access station may comprise only one tilting device arranged to tilt at least one storage container in the picking zone. The tilting device may be arranged to tilt a plurality of storage containers, thereby increasing throughput as storage containers are not delayed by a tilting process in the picking zone but enter the picking zone in an already tilted position.

The picking zone may be arranged to receive only one storage container. Typically, the picking zone may be arranged in an aperture of an access station, the access station being covered with panels except for the picking zone and the entry and exit positions. With only one storage container in the picking zone at a time, a picking person is less likely to be confused as to which storage container he/she should pick from. This problem is less likely to occur with a robotic picker, and an access station to be operated by a robotic picker may therefore be arranged with a picking zone arranged to receive a plurality of storage containers, for example by removing the top panels of an access station to uncover all storage containers within.

The tilting device may be arranged to tilt only one storage container. This may be advantageous for access station without panels, as it will be apparent to the picking person that only the tilted container should be picked from.

The access station may comprise three tilting devices. The three tilting devices may be arranged consecutively and adjacent each other along a front side of the access station. Each tilting device may comprise or form part of a conveyor to transport storage containers. Advantageously, the three tilting devices may each tilt one conveyor. Thus, a centre conveyor may be arranged in a tilted position when the access station is operated with a picking person, and the two lateral conveyors to each side tilt a storage container into and back out of a tilted position respectively upstream and downstream of the centre conveyor. As storage containers are not tilted in the picking zone, there is no delay as a storage container is brought into the picking zone, and this configuration may provide a more efficient access station.

However, should the access station be operated by a robotic picker, all three tiltable conveyors can be arranged in a horizontal position, thereby increasing picking efficiency and speed due to the removal of time spent on tilting storage containers.

The access station may comprise an entry conveyor arranged to transport storage containers from the entry position to at least one access conveyor, and an exit conveyor may be arranged to transport storage containers from the at least one access conveyor to the exit position.

A transport direction of the entry conveyor may be parallel and opposite to a transport direction of the exit conveyor, and wherein a transport direction of the at least one access conveyor may be orthogonal to the transport directions of the entry and exit conveyors. Thus, the access station may have a relatively small width, substantially corresponding to three grid cells, with a U-shaped path of the storage containers and therefore requires less space than prior art solution. Furthermore, the access station may be more compatible with automated storage and retrieval systems which comprise two parallel storage system conveyors spaced at a distance of one grid cell to which the access station may be easily fitted.

The tilting device(s) may be arranged to tilt around an axis parallel to a transport direction of the at least one access conveyor. Thus, the tilting device may preferably tilt towards a front side of the access station, where a picking person may typically be located for picking from the storage containers.

The picking zone may be arranged towards a front side of the access station, and the access station may be arranged to receive an order container conveyor between the picking zone and a back side of the access station. In some configurations, an order container conveyor may be arranged to a side of the access station.

The invention relates to a method for operating an access station according to the first aspect, wherein the method comprises the steps of:
- receiving a storage container at the entry position,
- transferring the storage container from the entry position to the picking zone,
- tilting the storage container with a tilting device,
- transferring the storage container from the picking zone to the exit position,
- delivering a storage container at the exit position.

Depending on the configuration of the tilting device, the step of tilting the storage container with a tilting device may be performed when the storage container is in the picking zone, or it may be performed before the storage container is in the picking zone.

The invention may relate to a further method for operating an access station according to the first aspect comprising the steps of:
- receiving a storage container at the entry position,
- transferring the storage container from the entry position to a first lateral access conveyor with an entry conveyor,
- tilting the storage container with the first lateral access conveyor,
- transferring the storage container from the first lateral access conveyor to the picking zone,
- transferring the storage container from the picking zone to the second lateral access conveyor,
- tilting the storage container with the second lateral access conveyor,
- transporting the storage container from the second lateral access conveyor to the exit position with the exit conveyor.

The method may also comprise the step of tilting a centre access conveyor in the picking zone, such that it is ready to receive a tilted storage container.

In a second aspect the invention relates to an access station for picking storage containers, comprising:
- a picking zone,
- an entry conveyor arranged to transport storage containers from an entry position to a first lateral access conveyor, where the first lateral access conveyor is arranged to tilt a storage container and to transport said storage container to a centre access conveyor arranged in the picking zone,
- the centre access conveyor is permanently tilted and arranged to transport storage containers from a first lateral access conveyor to a second lateral access conveyor, where the second lateral access conveyor is arranged to tilt a storage container and to transport said storage container to an exit conveyor,
- the exit conveyor is arranged to transport storage containers from the second lateral access conveyor to an exit position.

A transport direction of the entry conveyor may be parallel and opposite to a transport direction of the exit conveyor, and wherein a transport direction of the at least one access conveyor may be orthogonal to the transport directions of the entry and exit conveyors. Thus, the access station may have a relatively small width, substantially corresponding to three grid cells, with a U-shaped path of the storage containers and therefore requires less space than prior art solution. Furthermore, the access station may be more compatible with automated storage and retrieval systems which comprise two parallel storage system conveyors spaced at a distance of one grid cell to which the access station may be easily fitted.

The access station may also comprise protective paneling to shield a picking person from injury if he/she should try to reach inside the access station. The protective paneling may comprise an aperture with a sliding door in the picking zone, thereby only allowing the picking person to see one storage container at a time which minimizes the risk of picking errors.

The invention relates to a method for operating an access station according to the second aspect, wherein the method comprises the steps of:
- receiving a storage container at the entry position,
- transporting the storage container from the entry position to the first lateral access conveyor,
- tilting the storage container with the first lateral access conveyor,
- transferring the storage container from the first lateral access conveyor to the picking zone,
- transferring the storage container from the picking zone to the second lateral access conveyor,
- tilting the storage container with the second lateral access conveyor,
- transporting the storage container from the second lateral access conveyor to the exit position with the exit conveyor.

The invention further relates to an automated storage and retrieval system, the automated storage and retrieval system comprising:
- a rail system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks;
- a plurality of stacks of storage containers arranged in storage columns located beneath the rail system, wherein each storage column is located vertically below a grid opening;
- a plurality of container handling vehicles for handling storage containers in the automated storage and retrieval system,
- each vehicle being configured to move on the rail system above the storage columns,
- each vehicle comprising
  - a vehicle body and
  - a wheel assembly connected to the vehicle body, the wheel assembly being configured to guide the vehicle along the rail system in at least one of the first direction and the second direction; and
- an access station, wherein the access station comprises an access station according to any of the aforementioned aspects and in that
- the system comprises:
  - at least one storage system conveyor arranged below at least one delivery column, wherein the at least one storage system conveyor is arranged to transfer storage containers between; a transfer position below the at least one delivery column, to the entry position and from the exit position of the access station.

The system may comprise two storage system conveyors, a first storage system conveyor may be arranged to transport storage containers from the transfer position below the at least one delivery column to an entry position of the access station, and a second storage system conveyor may be arranged to transport storage containers from the exit position of the access station to the transfer position below the at least one delivery column.

The conveyors used in the access station according to any of the aforementioned aspects may comprise rolls with and/or without integrated motors. Typically, one conveyor roll comprises an integrated motor and is connected by at least one band to the remaining rolls for driving these. Different kinds of conveyors may be used which also allow the movement of storage containers perpendicular to the transport direction of the conveyors such as conveyor belts, wheels, balls or any similar conveying means or combinations of conveying means as will be apparent to the person skilled in the art based on the disclosure of the invention herein.

In the following description, numerous specific details are introduced by way of example only to provide a thorough understanding of embodiments of the claimed device, system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

The following drawings are appended to facilitate the understanding of the invention.

FIG. 1A and FIG. 1C show the complete system and FIG. 1B and FIG. 1D show examples of system operable prior art container handling vehicles.

FIG. 2A shows a single track system, FIG. 2B shows a double track system 2B and FIG. 2C shows a double track system indicated width and length of a container handling vehicle grid cell.

In the drawings, like reference numerals have been used to indicate like parts, elements or features unless otherwise explicitly stated or implicitly understood from the context.

DETAILED DESCRIPTION OF THE INVENTION

Figure 1:
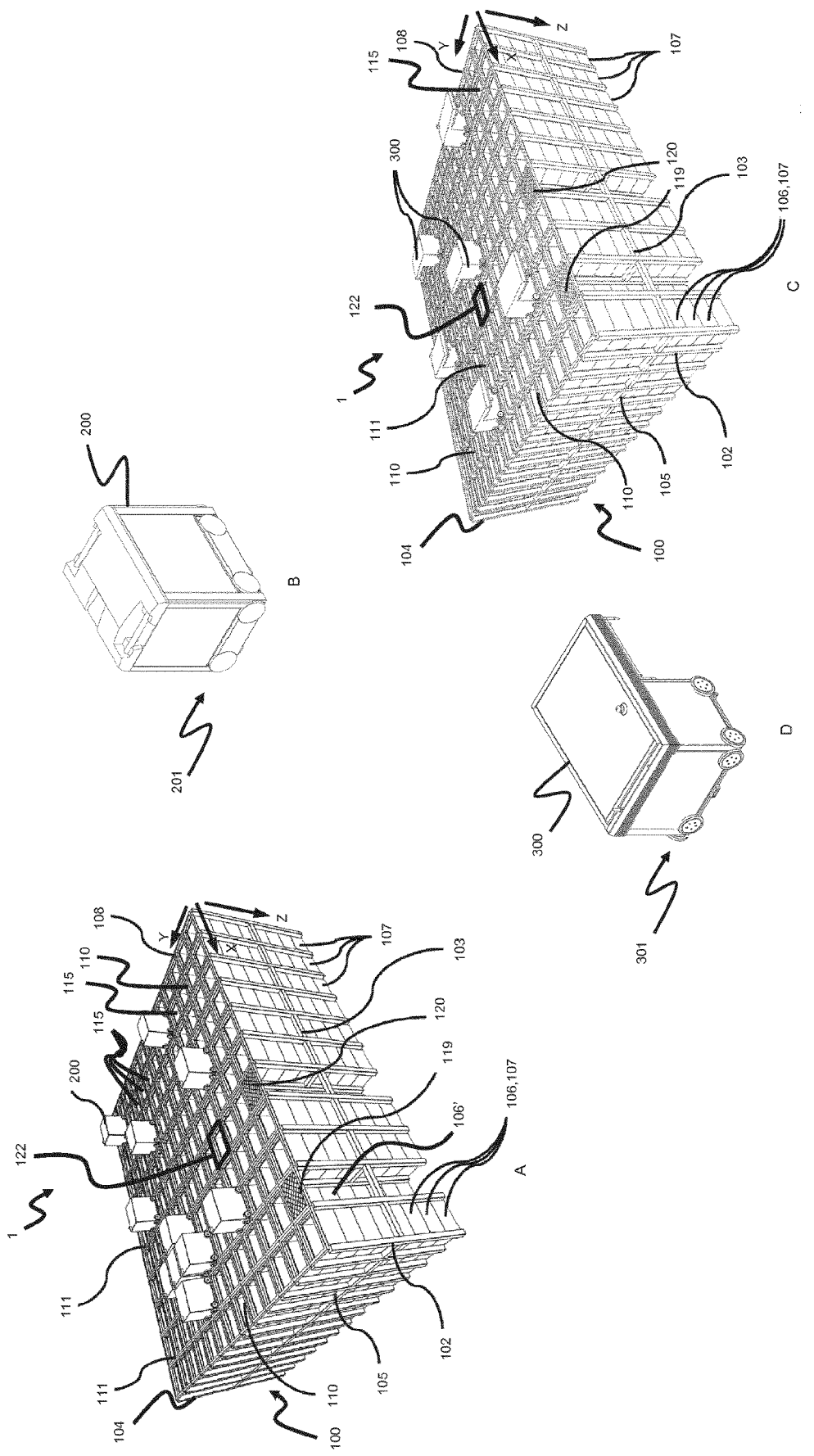
FIGS. 1A-D are perspective views of a prior art automated storage and retrieval system, where

In the following, embodiments of the invention will be discussed in more detail with reference to the appended drawings. It should be understood, however, that the drawings are not intended to limit the invention to the subject-matter depicted in the drawings.

Figure 3:
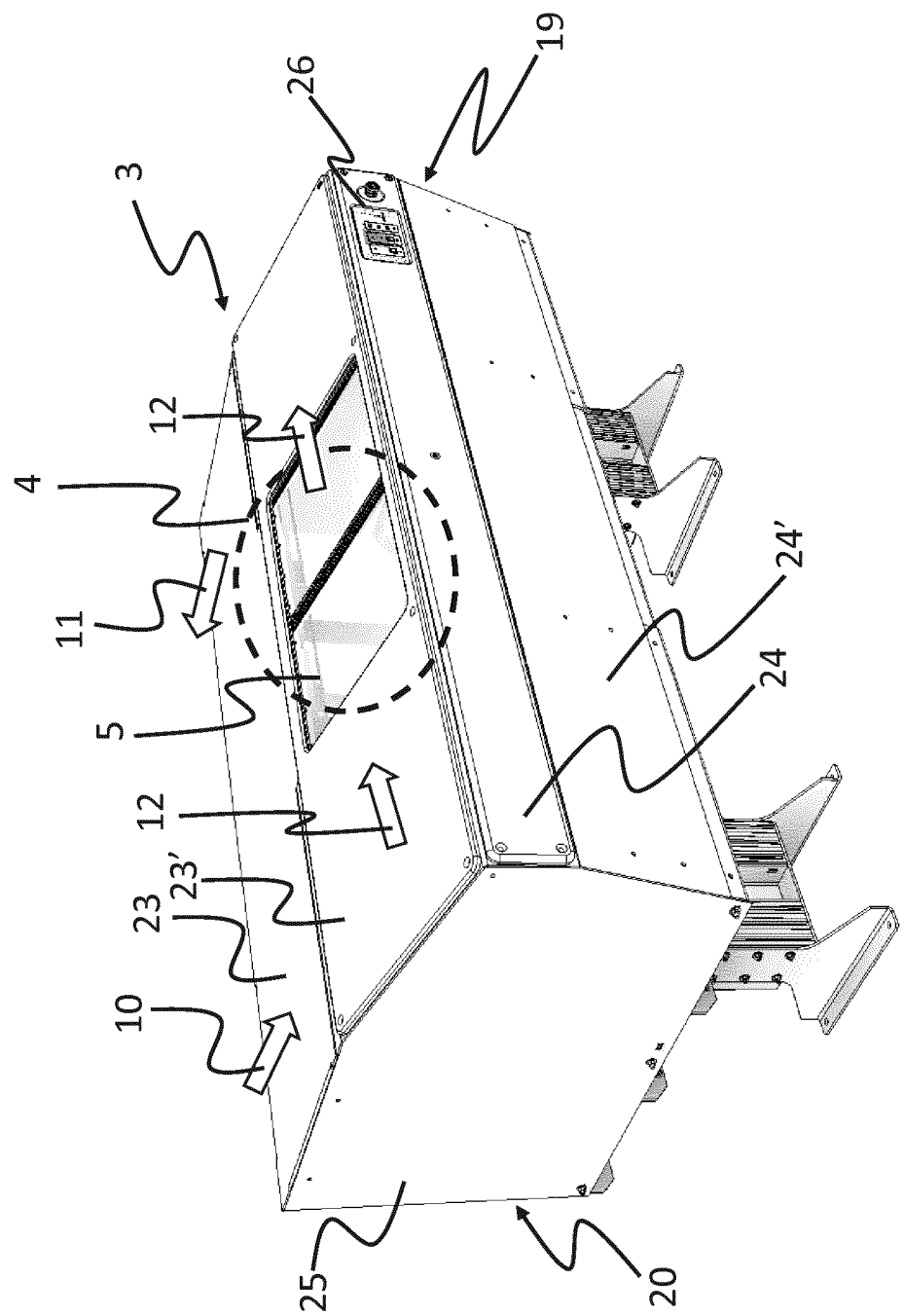
FIG. 3 is a perspective view of an access station, with exterior panels.

FIG. 3 is a perspective view illustrating a front end 19 of an access station 3, where the front end 19 may be defined as where a picking person or a robotic picker 14 (not shown in FIG. 3) is intended to pick articles from the storage containers 106 passing through the access station 3. The articles are picked at a picking zone 4 which is illustrated by the dashed circle at the front end 19 of the access station, the back end 20 is not visible in FIG. 3. The access station 3 comprises top panels 23,23', front panels 24,24' and side panels 25,25' forming an outer housing and covering the inner mechanisms. The panels 23,24,25 prevent injuries to a picking person or human operator trying to reach inside the housing, as the panels 23,24,25 shield the inner mechanisms. The top panel 23 is arranged to accommodate an order container conveyor 46 which may pass over said top panel 23, such that goods may be picked from a storage container 106 in the picking zone 4 and placed on the storage goods conveyor and vice versa.

In the embodiment of FIG. 3, the back end 20 may be without panels so as to allow the entry and exit of storage containers 106 to the access station 3 through the back end 20. The picking zone 4 is illustrated as comprising an aperture in a tilted top panel 23' with a closed sliding door 5. In an open position, the sliding door 5 uncovers the entire top area of one storage container 106 such that its contents may be viewed, accessed and picked. According to the embodiment of FIG. 3, a storage container 106 can only be picked when it is located beneath the sliding door 5 in an open position, and as such the sliding door 5 may define the picking zone 4. The sliding door 5 ensures that only the storage container 106 located in the picking zone 4 can be picked when the sliding door 5 is open, thus avoiding risk of injury from a picking person reaching into the access station 3. The sliding door 5 may ensure that only one storage container 106 is accessible at a time, thereby minimizing confusion for the picking person regarding which storage container 106 is to be picked from, in contrast to the prior art where a series of storage containers 106 openly pass by the picking zone. The panels 23,24,25 and sliding door 5 may not be necessary for embodiments configured with a robotic picker 24 which is less prone to injury from reaching inside the access station 3.

As previously mentioned, the back end 20 comprises an entry position 6 and an exit position 7 arranged to respectively receive and deliver storage containers 106 to and from the access station 3. However, in other embodiments of the invention, not illustrated herein, the entry position 6 and exit position 7 may be arranged at other locations, for example to the sides of the access station 3.

The access station 3 illustrated in FIG. 3 is exemplified as transporting storage containers 106 in the direction represented by arrows 10,11,12. Thus, storage containers 106 are transported from an entry position 6 where they are in a horizontal position towards the front end 19 of the access station 3, represented by arrow 10. At the front end 19 of the access station 3 the direction of movement changes to transport storage containers 106 along the front end 19, represented by arrows 12, and thereby past the picking zone 4. The storage containers 106 can be brought from a horizontal position to a tilted position whilst at the front end 19 of the access station 3, such that the storage containers 106 may be in a tilted position in the picking zone 4. The ability to tilt the storage container 106 allows a picking person to view and/or access the articles within the storage container 106 more easily.

The tilting angle range may be from 2° to 60° around a pivot axis extending along the front end 19 of the access station 3 and relative to the horizontal plane. The tilting angle should not exceed a maximum tilting angle that would represent a significant risk of stored items/articles tipping out of the storage container in question. This maximum allowed tilting angle depends on the amount and size of items/articles within the storage container. A storage container 106 being filled with items up to its upper rim will have a lower maximum tilting range that a storage container 106 having items filling the containers' 106 vertical height only partly. Accordingly, the tilting angle range may typically be for example be from 9° to 20°, for example 15°. The tilting angle may be adjustable according to the height of the access station from the floor, and the height of the picking person. The tilting angle may therefore be set to an optimal angle for picking for a certain picking person. The exterior housing comprising the panels 23,24,25 may likewise be adapted to the tilting angle range. For example, the exterior housing in a certain embodiment may be arranged for a maximum tilting angle such that storage containers 106 may be tilted at any smaller angle.

A control panel 26 is arranged on the front panel 24 of the access station 3. The control panel 26 may be configured to set specifications for controlling picking operations such as the speed of transport for storage containers 106 through the access station 3, reversal of the transport direction, opening and closing of the sliding door 5, whether to tilt storage containers 106 passing through, tilting of only one storage container 106 being in the picking zone 4, the tilting angle of the storage containers 106 and/or emergency stop functions. The control panel 26 may also have a user interface, such as a screen or display configured to display the specifications of the access station 3, the weight of a certain storage container 106 and its content and/or the identification number of a certain storage container 106. If the access station 3 is to be used with a robotic picker 14, the control panel 26 may also be connected with the robotic picker 14 to synchronize their operations.

For the first aspect of the invention where storage containers 106 may be tilted in the picking zone 4, as in FIGS. 4 and 5, the access station 3 is more suited to be used by either a picking person and/or a robotic picker 14. Tilting of storage containers 106 is advantageous when a picking person uses the access station 3, however, the tilting operation inevitably causes lag in the flow of storage containers 106 flowing through an access station 3. According to the first aspect illustrated in FIGS. 4 and 5, tilting is optional and can be regulated with the control panel 26.

Depending on whether a picking person or a robotic picker 14 is used to pick the storage containers 106 passing through the access station 3, specifications for controlling the picking operation may be set by the control panel 26 which are suited to each particular use. As a robotic picker 14 may have a reach and visual angle which does not require tilting of the storage containers 106, the specifications of the operation of the access station 3 may be set accordingly, i.e. tilting of storage containers 106 is not performed during routine picking operation. The sliding door 5 may also be kept in an open position when used with a robotic picker 14 as the robot 14 is not prone to harm from reaching into the access station 3 and getting stuck in machinery. However, should a human operator require visual inspection of the work of the robotic picker 14 or perform random checks of certain storage containers 106, then the control panel 26 can be used to tilt one storage container 106 in the picking zone 4, or a number of storage containers 106 passing by at set intervals.

Figures 4A, 4B:
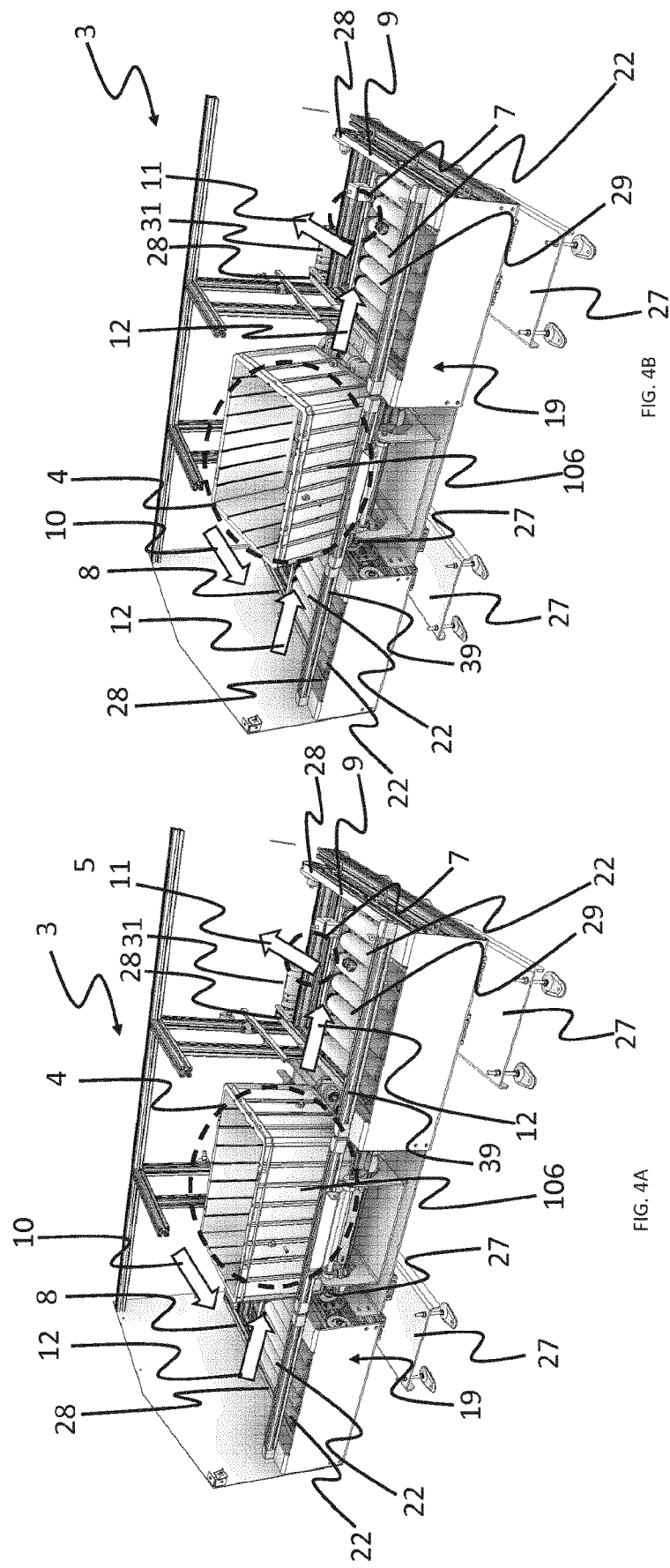
FIG. 4A is a perspective view of the front end of an access station according to a first aspect, with a storage container located in the picking zone and arranged in a horizontal position.
FIG. 4B is a perspective view of the frond end of an access station according to the first aspect, with a storage container located in the picking zone in a tilted position.

FIG. 4A and FIG. 4B illustrate a front end 19 of an access station 3 in a perspective view according to the first aspect, where most of the exterior panels have been removed such that the frame and inner mechanisms are visible. The frame may be made from extruded aluminium profiles. Electric cabling may be arranged in or along the frame and panels of the access station for powering, measuring and controlling the different functionalities of the access station 3.

In the exemplary embodiment of FIGS. 4A and 4B, storage containers 106 are received at the back side 20 of the access station 3 at an entry position 6 located on an entry conveyor 8. Typically, the entry position 6 is configured for connection to another conveyor, for example a storage system conveyor 16,17 which transports storage containers 106 to and from the entry position 6, see FIG. 8. Upon entering the access station 3, the entry conveyor 8 transports the storage container 106 in a transport direction represented by the arrow 10 to a lateral access conveyor 22. The entry conveyor 8 is exemplified as comprising two transport belts 28 driven by an electric motor 31, but as will be apparent to the person skilled in the art, various types of conveyors may be employed.

The embodiment of FIGS. 4A and 4B is further illustrated as comprising three access conveyors; two lateral access conveyors 22 for transporting storage containers 106 from and to the entry conveyor 8 and exit conveyor 9, and one centre access conveyor 21 for transporting storage containers 106 between the two lateral access conveyors 22 on each side. The lateral access conveyors 22 are exemplified as comprising a plurality of roller conveyors 29 for transporting storage containers 106 along in an access conveyor direction, represented by the arrows 12, along the direction of the front end 19 of the access station 3. The roller conveyors 29 are mounted on a roller conveyor frame 30 which extends between the two transport belts 28 of the entry conveyor 8, similarly for the exit conveyor 9. Typically, one of the rollers in a roller conveyor 29 comprises an integrated driving motor (not shown), whilst the remaining rollers may be connected by belts (not shown) to the driving roller, or they may be passive. The lateral access conveyors 22 comprise a frame 30 comprising roller conveyors 29 and are displaceable by a lifting mechanism (not shown) such that a lateral access conveyor 22 can be lifted between a lower position and an upper position. Thus, a storage container 106 is transported in on the transport belts 28 of the entry conveyor 8, and once in position over the roller conveyors 29 they are lifted up with the frame 30 (see FIGS. 5A and 5B). With the lateral access conveyor 22 in an upper position, the storage container 106 will now rest on the lateral access conveyor 22 and can be transported along the front end 19 of the access station 3 in the direction of arrow 12. At the overlaps between the entry conveyor 8, exit conveyor 9 and the lateral access conveyors 22, the direction of transport of the storage containers 106 therefore changes orthogonally.

Although the entry conveyor 8, exit conveyor 9 and centre access conveyor 21 are exemplified as comprising transport belts 28, and the lateral access conveyors 22 are exemplified as roller conveyors 29 in the configurations disclosed in FIG. 4 and FIG. 5, it will be apparent to the person skilled in the art that a variety of other conveyors may be used such as rail mounted trolleys, belts or conveyor balls.

Though hidden from view by the storage container 106 in FIGS. 4A and 4B, the centre access conveyor 21 comprises two transport belts 28, similar to those of the entry conveyor 8 and the exit conveyor 9. However, as will be apparent to the person skilled in the art, various types of conveyors may be employed for the centre access conveyor 21.

The centre access conveyor 21 is located in the picking zone 4, represented by the dashed circle, in FIG. 4A, and a storage container 106 is illustrated in a horizontal position on the centre access conveyor 21 in the picking zone 4. When the access station 3 is used with a robotic picker 14, the storage container 106 may be picked in a horizontal position as in FIG. 4A. The position of the storage container 106 in FIG. 4A may also be pre- or post-tilting, i.e. respectively upon arrival of the storage container 106 to the lateral access conveyor 21 before tilting and potential picking, and after the storage container 106 has been tilted back to a horizontal position before transport to the lateral access conveyor 22, e.g., for a human picker.

In FIG. 4B, a storage container 106 is illustrated in a tilted position on the centre access conveyor 21 in the picking zone 4. The storage container 106 may be brought to this position when it is to be accessed and/or viewed by a human operator, e.g. when the access station 3 is used with a picking person. However, the storage container 106 may also be picked by a robotic picker 14 in a tilted position. The centre access conveyor 21 is arranged to be tilted by a tilting device 13 (not visible in FIGS. 4A and 4B) around a longitudinal direction parallel to the direction of transport 12 of the access conveyors 21,22. The centre access conveyor 21 may therefore be hingedly connected to the frame of the access station 3 towards the front end 19. As previously mentioned, the tilting device 13 may be arranged to tilt the storage containers 106 in a tilting angle range from 2° to 60°, where the desired angle may be set by the control panel 26.

In a horizontal position, the centre access conveyor 21 transfers the storage container 106 from the picking zone 4 to the lateral access conveyor 22 in the direction represented by arrow 12, which is raised to an upper position to receive the storage container 106 above the transport belts 28 of the exit conveyor 9. Once the storage container 106 is in the overlapping position of the lateral access conveyor 22 and the exit conveyor 9, a frame 40 of the lateral access conveyor 22 is lifted down to a lower position such that the storage container 106 comes to rest on the belts of the exit conveyor 9. Upon being supported on the transport belts 28 of the exit conveyor 9, the storage container 106 can be transported in the direction represented by the arrow 11 to the exit position 7, represented by the dashed circle, and delivered out of the access station 3. The exit conveyor 9 may typically be configured for connection to another conveyor at the exit position 7, for transporting the storage containers 106 away from the access station 3.

The access station 3 may comprise adjustable feet 27, exemplified in FIGS. 4A to 5B, these adjustable feet 27 may be used to level the access station 3 on an uneven floor or to adjust the access station 3 to meet conveyors at the entry position 6 and the exit position 7.

Figure 5A:
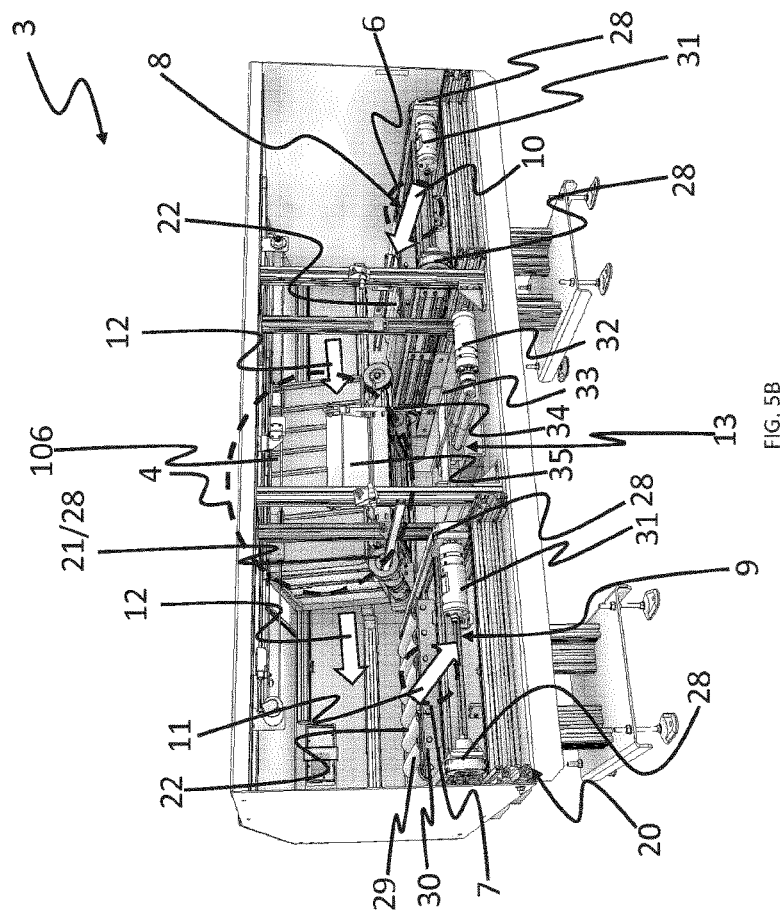
FIG. 5A is a perspective view of the back end of an access station according to the first aspect, with a storage container located in the picking zone in a horizontal position.
Figure 5B:
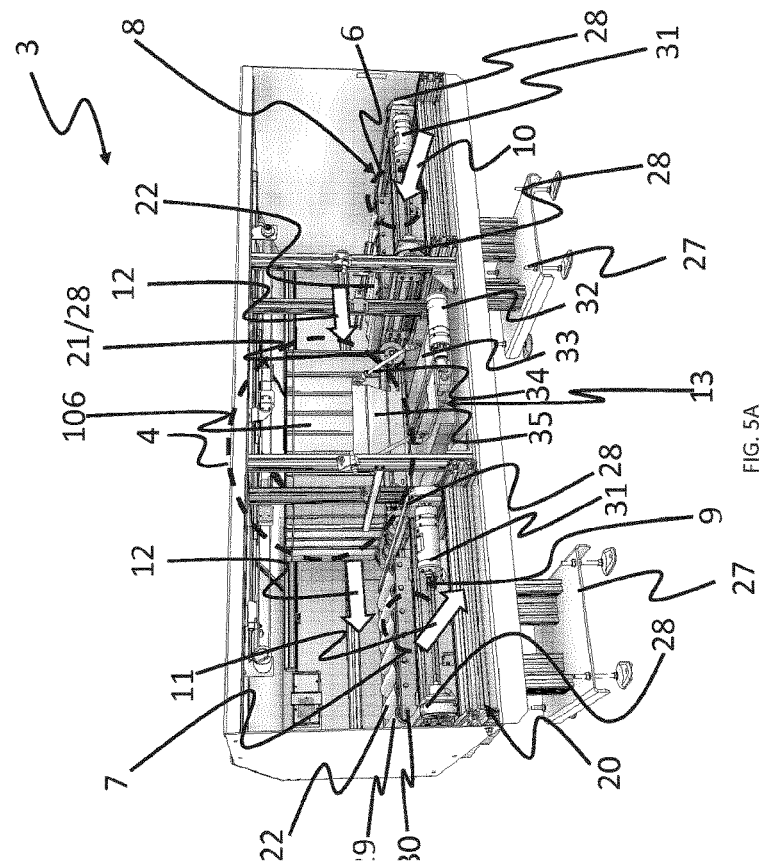
FIG. 5B is a perspective view of the back end of an access station according to the first aspect, with a storage container located in the picking zone in a tilted position.

FIGS. 5A and 5B illustrate the first aspect as in FIGS. 4A and 4B respectively, where the back end 20 of the access station 3 is shown in a perspective view. No exterior panels have been stripped in the views of FIGS. 5A and 5B, as the back end 20 of the access station 3 may typically be open to allow the entry and exit of storage containers 106. Both the entry position 7 and the exit position 8 are visible in FIGS. 5A and 5B illustrated on the entry conveyor 8 and the exit conveyor 9 respectively, showing the transport belts 28 and driving motors 31 of the said conveyors 8,9. The driving motors may typically comprise electric motors. However, it is conceivable that the various electric motors of the access station 3 may be driven by motors with other power sources than electric, such as e.g. pneumatic pressure. The frame 30 for the roller conveyors of the lateral access conveyors 22 is also more clearly visible in FIG. 5A and FIG. 5B, and the transport belts 28 of the exit conveyor 9 can be seen passing by on each side of the roller conveyor frame 30.

The lifting device 13 is shown in FIG. 5A in a horizontal position, and in FIG. 5B in a tilted position. Shown in the tilted position in FIG. 5B, the open top of a storage container 106 is brought up to the sliding door 5. The lifting device 13 is powered by a tilting motor 32, which drives a displacement belt connected to a sliding frame 33. Hingedly connected to the sliding frame 33 are the ends of two rods 34, where the opposite end of the rods 34 hingedly connected to a frame 35 which is rigidly connected to the centre access conveyor 21. Thus, the tilting motor 32 drives the belt, which laterally displaces the sliding frame 33 and the rods 34 will accordingly move to tilt the centre access conveyor 21 around a hinged connection (not visible in FIGS. 5A and 5B) provided at the front end 19 of the access station 3.

As illustrated in FIGS. 5A and 5B the centre access conveyor comprises a frame 35 provided with transport belts 28 for transport of storage containers 106, where the belts 28 are driven by an electric motor 31. The frame 35 of the centre access conveyor 21 may comprise a weighing mechanism, such as load cells arranged on the frame 35 (not shown). The load cells may be signally connected to the control panel 26. As will be apparent, the centre access conveyor 21 may also comprise other kinds of conveyors such as roller conveyors 29. In configurations where roller conveyors 29 are used for the centre access conveyor 21, it is conceivable that the tilting device 13 comprises rods or a frame which can pass up between the rollers to tilt a storage container 106.

Figure 6A:
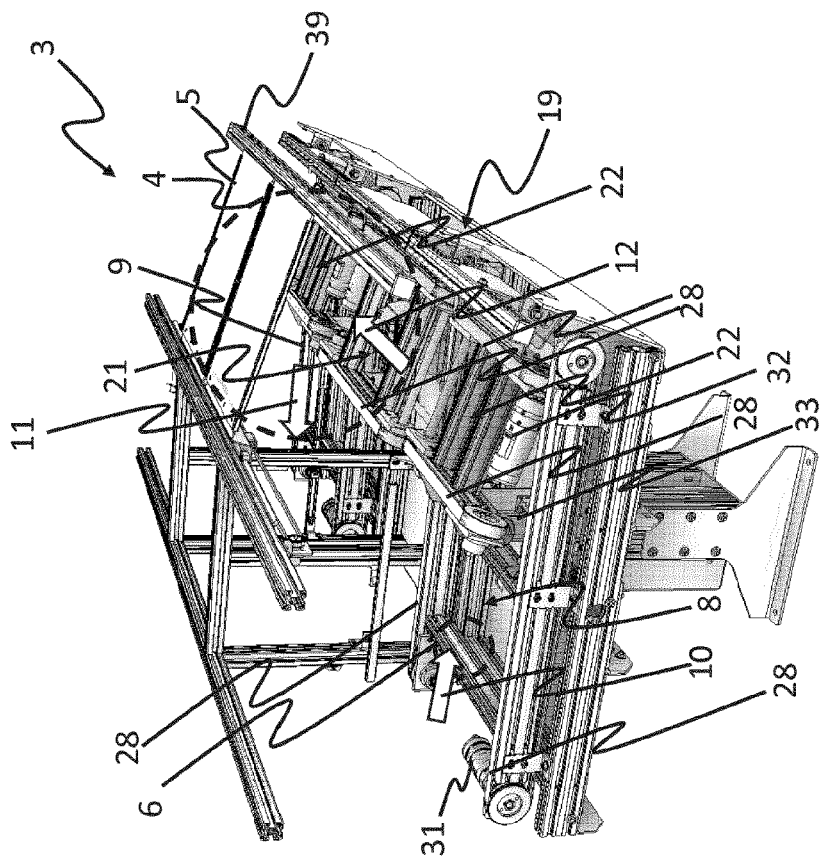
FIG. 6A is a perspective view of the side of an access station according to a second aspect, with its lateral access conveyors in a horizontal position.
Figure 6B:
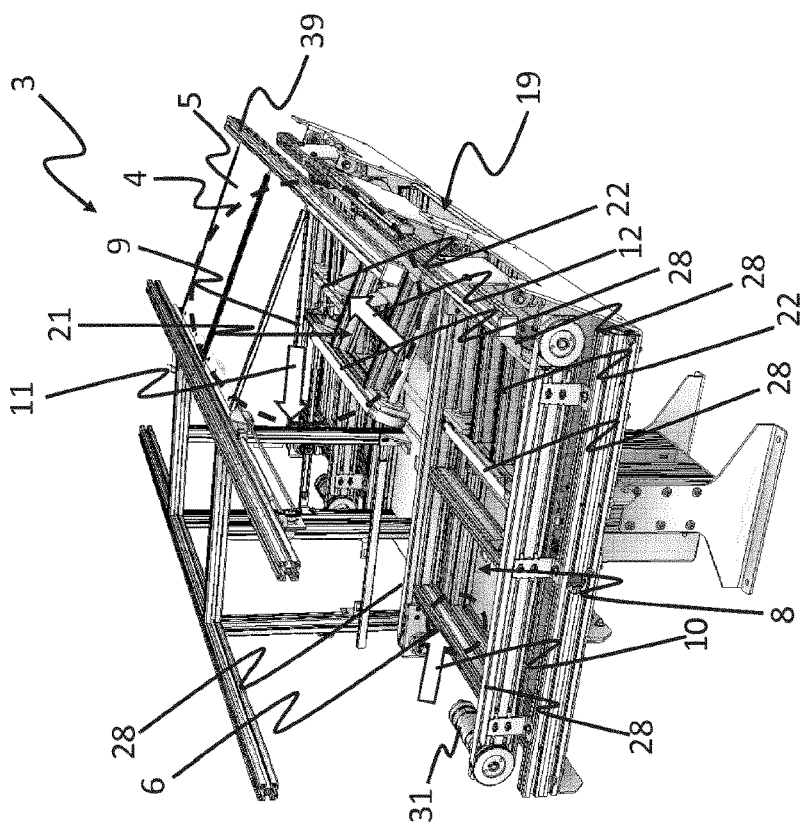
FIG. 6B is a perspective view of the side of an access station according to the second aspect, with its lateral access conveyors in a tilted position.
Figure 7:
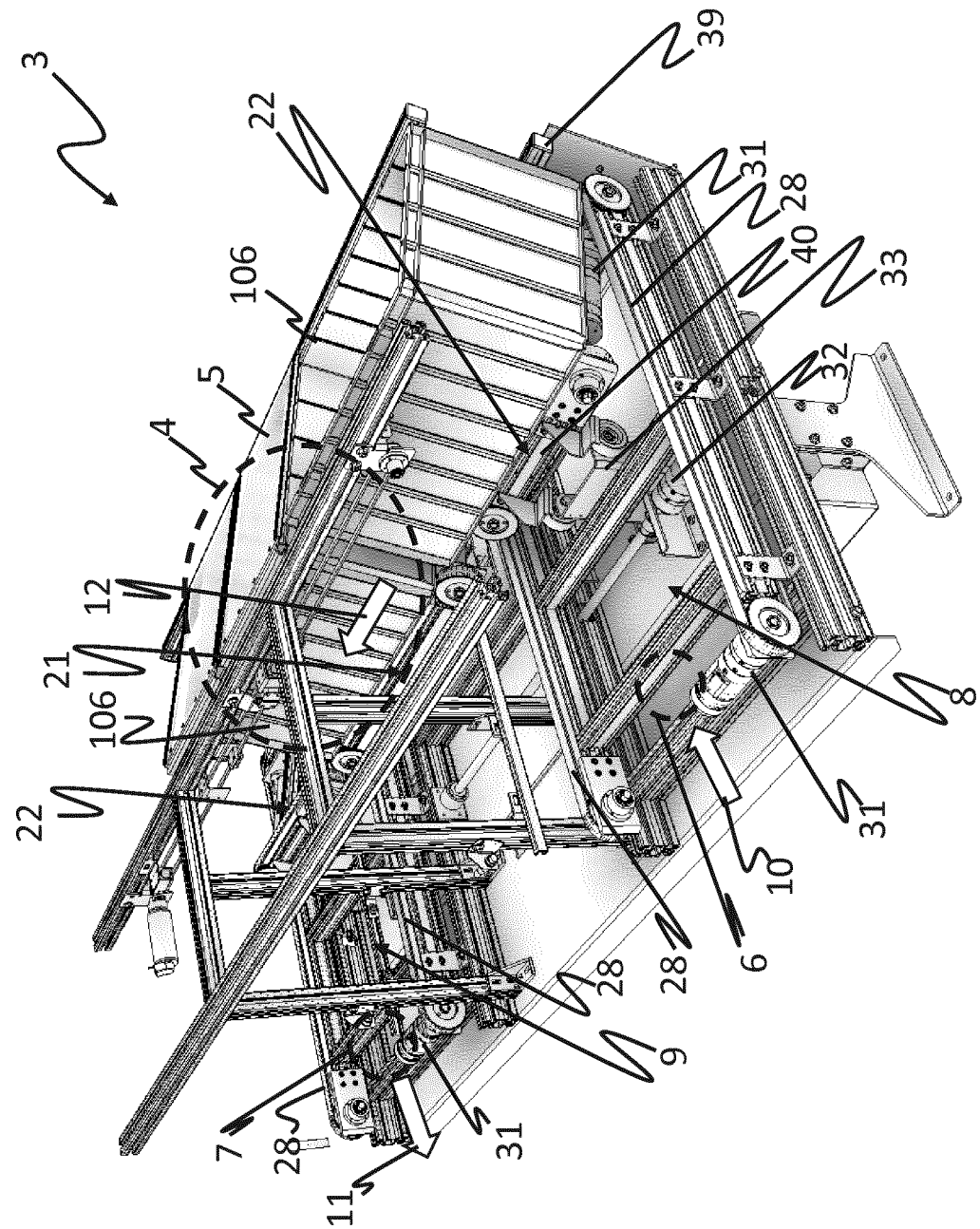
FIG. 7 is a perspective view of the back end of an access station according to the second aspect, with one storage container in the picking zone and another storage container on a lateral access conveyor in a tilted position.

FIGS. 6A, 6B and FIG. 7 illustrate a second aspect of an access station 3, comprising a distinct inner mechanism relative to the first aspect of FIGS. 4A to 5B. Most notably, the second aspect comprises a permanently tilted centre access conveyor 21, whilst the lateral access conveyors 22 are tiltable. Tilting the storage containers 106 before and after they enter the picking zone 4 may allow for faster transport of storage containers 106 through the access station. This is due to the simultaneous operations that are allowed when storage containers 106 are not tilted in the picking zone 4; a storage container 106 in the picking zone 4 can be picked whilst an upstream storage container 106 is brought onto the lateral access conveyor 22 and tilted into a tilted position such that it is ready for transport to the picking zone 4, and a downstream storage container 106 is tilted back to horizontal position and transported away with the exit conveyor 9, upon which the tilting device 13 brings the lateral access conveyor 22 back to a tilted position to receive a picked storage container 106.

The second aspect in FIGS. 6 and 7 may comprise a similar frame and exterior housing to that of FIG. 3. Thus, the access station 3 of FIGS. 6 and 7 may take up substantially the same size as those illustrated in FIGS. 3-5.

FIG. 6A and FIG. 6B show an access station 3 stripped of plates in a perspective view from a corner of the front end 19. FIG. 6 illustrates the access station 3 without storage containers 106 on the conveyors 8,22,21,9 and the transport and tilting mechanisms are therefore visible. As FIG. 6A illustrates, all the conveyors 8,22,21,9 in this configuration are exemplified as comprising transport belts 28. However, many other kinds of conveyors may be employed in various different configurations.

FIG. 6A illustrates the entry position 6 on the entry conveyor 8 where storage containers 106 enter the access station 3. Similarly to the conveyor configurations of FIGS. 4 and 5, the entry conveyor 8 is arranged to transport storage containers 106 from the entry position 6 up to the front end 19 of the access station 3 and over the lateral access conveyor 22. The transport belts 28 of the entry conveyor 8 therefore pass on each side of the lateral access conveyor 22. FIG. 6A illustrates the lateral access conveyor 21 in a horizontal position, where it is arranged below the entry conveyor 8 such that storage containers 106 can pass unhindered above on the entry conveyor 8.

Forward guide rails 39 are arranged to guide storage containers 106 as they are transported along the front end 19 of the access station 3, and these also hinder storage containers 106 from crashing into the inside frame or panels of the access station 3 as the storage containers 106 are transported by the entry conveyor 8. Such forward guide rails 39 are also present in the configurations of FIG. 4A-5B.

The lateral access conveyor 22 is arranged on a frame 40, which frame also comprises a portion of the forward guide rail 39. The frame 40 of the lateral access conveyor 22 is tiltable around a hinged connection. The lateral access conveyor 22 may thus be lifted above the entry conveyor 8, such that storage containers 106 can change direction unhindered and be transported along the front end 19 of the access station 3. A tilting device 13 (not visible in FIG. 6) is hingedly connected to a back end of the frame 40 of the lateral access conveyor 22.

The lateral access conveyor 22 illustrated in FIGS. 6 and 7, may be of a similar configuration to the centre access conveyor 21 illustrated in FIGS. 4A to 5B comprising two transport belts 28, although the frame 40 and tilting device 13 connected to said frame 40 may differ to constructional constraints.

FIG. 7 is a perspective view of the back end 20 of an access station 3 stripped of plates, according to the second aspect illustrated in FIG. 6. Two storage containers 106 are shown in the access station 3, one on the permanently tilted centre access conveyor 21 in the picking zone 4, and the other on the lateral access conveyor 22 in a tilted position upstream of the picking zone 4. The sliding door 5 is also included in FIG. 7, illustrated in a closed position.

FIG. 7 illustrates in more detail the tilting device 13 of the lateral access conveyor 22, which comprises a different configuration to that of the tilting device 13 of the centre access conveyor 21 in FIGS. 4A to 5B. Due to space restrictions along the entry conveyor 8, the tilting device 13 in FIG. 7 comprises a sliding frame 33 mounted vertically, in contrast to horizontally as shown in FIGS. 4A to 5B. The feet of the access station 3 therefore also differ from the configuration in FIGS. 4A to 5B, to accommodate for space for the sliding frame 33. However, various different kinds of feet or platforms may be applied for an access station 3, and the configuration of FIGS. 6 and 7 could also be provided with adjustable feet. A drive motor 32 for tilting is shown below the entry conveyor 8, which may drive a belt connected to the sliding frame 33 and thus move it up or down to tilt the lateral access conveyor 22.

As will be apparent, many variations of tilting devices 13 and lifting mechanisms for the access conveyors 21,22 are conceivable. For example, the tilting device 13 illustrated in FIG. 7 for the lateral access conveyor 22 may also be used for the centre access conveyor 21 of the aspect in FIGS. 4A to 5B.

Similarly to the access station of FIGS. 4A to 5B, the access station of FIGS. 6 and 7 may be symmetric from centre to both sides. The conveyors 8,9,22 on each side can perform the same functions as those on the other side, although to transport storage containers 106 in another direction. For example, the exit conveyor 9 functions in reverse of the entry conveyor 8, and likewise with their adjacent lateral access conveyors 22. Therefore, the direction of transport of the storage containers 106 may easily be reversed.

In another configuration, an access station 3 may comprise a tiltable centre access conveyor 21 as illustrated in FIGS. 4A to 5B, whilst also comprising tiltable lateral access conveyors 22 as illustrated in FIGS. 6 and 7. Thus, storage containers 106 may be transported horizontally through the access station 3, as in the first aspect when used with a robotic picker 14, or storage containers 106 may be brought into the picking zone 4 in a tilted position as in the second aspect when used with a picking person.

Figure 8:
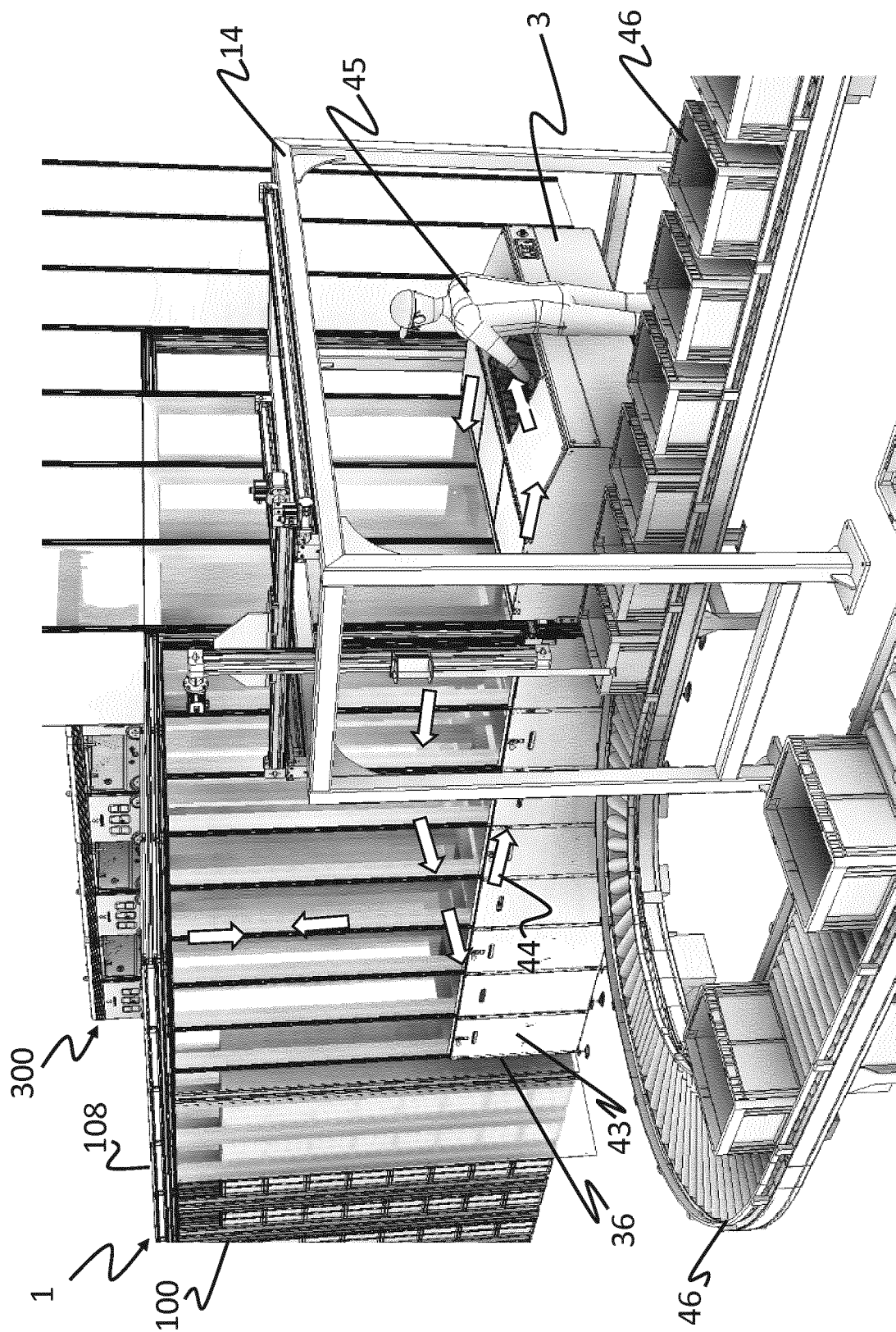
FIG. 8 is a perspective view of an access station connected to an automated storage and retrieval system, where a picking person is shown picking from a tilted container in the access station and a robotic picker is shown configured to pick from containers in the access station.

FIG. 8 illustrates an automated storage and retrieval system 1 comprising an access station 3 for picking from storage containers 106 of said automated storage and retrieval system 1.

Figure 2:
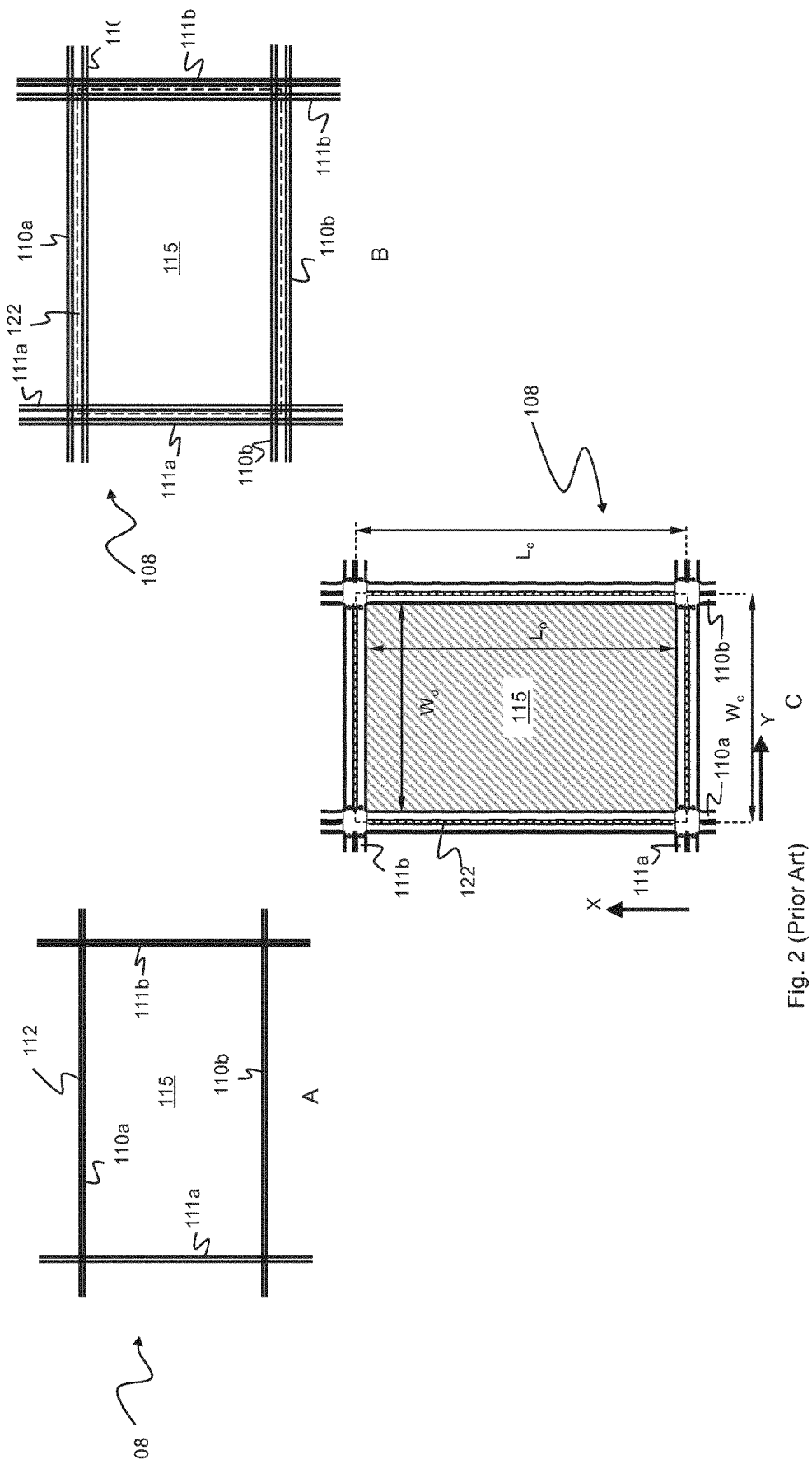
FIGS. 2A-C is a top view of a container handling vehicle rail system, where

The framework 100 of the automated storage and retrieval system 1 is constructed in accordance with the prior art framework 100 described above in connection with FIGS. 1 and 2, i.e. a number of upright members 102 and a number of horizontal members 103, which are supported by the upright members 102, and further that the framework 100 comprises a rail system 108 of parallel rails 110,111 in X direction and Y direction arranged across the top of storage columns 105/grid columns 112. The horizontal area of a grid column 112, i.e. the area along the X and Y directions, may be defined by the distance between adjacent rails 110 and 111, respectively (see FIG. 2).

Figure 9:
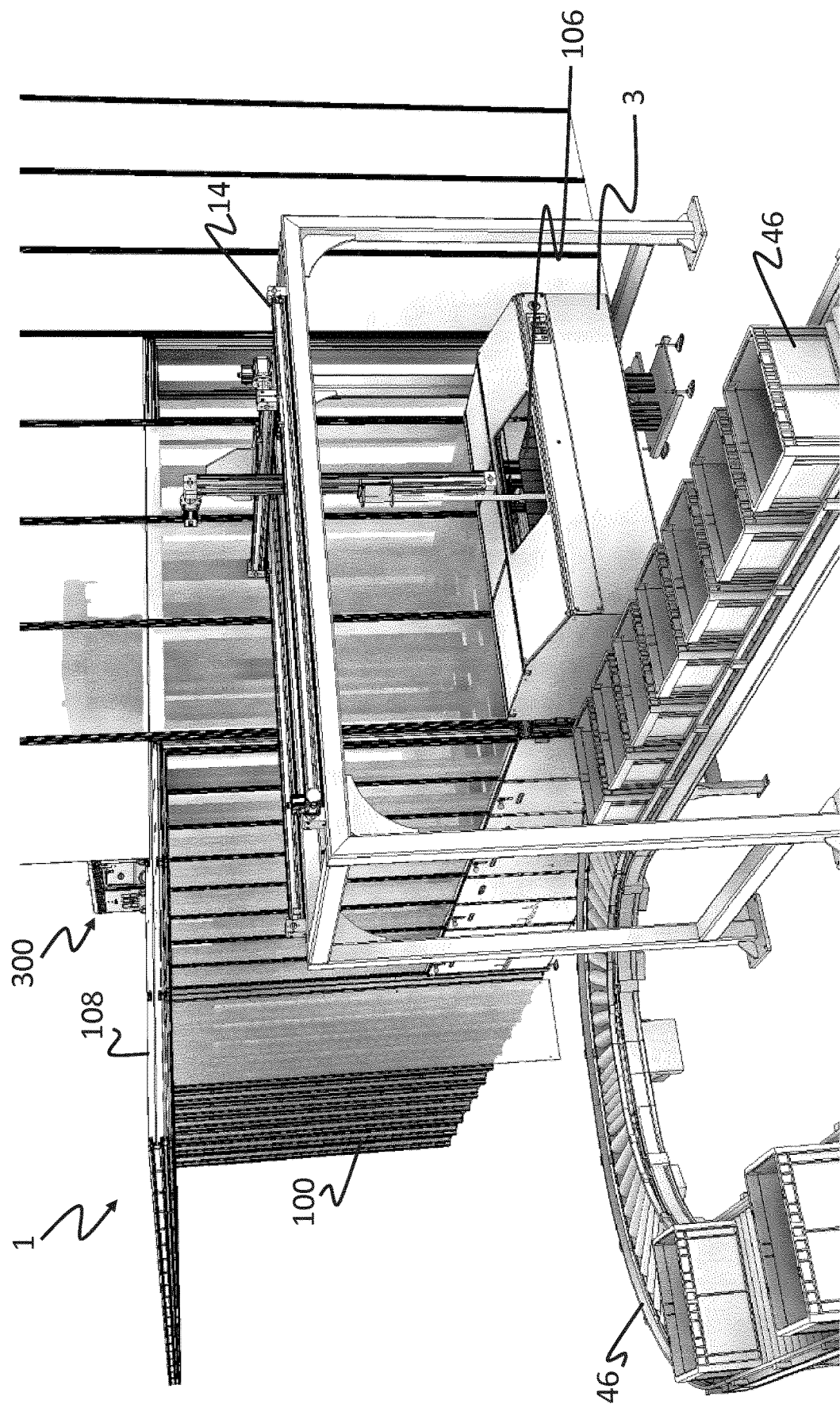
FIG. 9 is a perspective view of an access station connected to an automated storage and retrieval system, where a robotic picker is shown picking from a non-tilted container in the access station.

As illustrated in FIG. 8, between the access station 3 and the framework 100 there are located a plurality of relay modules 43; the relay modules are partially obscured behind the protective panels in FIG. 8 and FIG. 9. The upper part of the relay modules 43 comprises a rail system 108 which is integrated with the rail system 108 of the framework 100 and thereby allows container handling vehicles 200,300 to move from the framework 100 to positions above the relay modules 43. In FIG. 8 the container handling vehicles 300 are exemplified as those of FIG. 1D, however any kind of container handling vehicle 200,300 may be applied. Each relay module 43 comprises at least one conveyor on each side of a central transfer position to transport storage containers 106 to and from the access station 3, as indicated by the arrows 44. Storage containers 16 are thus lowered and lifted through a port column 119,120 by container handling vehicles 300 and down to the transfer position, at the transfer position the storage containers 106 are shifted sideways by a lateral displacement device and onto a conveyor. Simultaneously, storage containers 106 may be shifted from an opposing conveyor to the transfer position where they are retrieved by the container handling vehicles 300. It should be noted that many variations of relay modules 43 can be used in accordance with the invention, with different configurations to that described above, and the relay modules 43 of FIG. 8 are merely an illustrative example.

The conveyors of the relay modules 43 are configured to be connected into a continuous conveyor 16,17, arranged behind the protective panels 36 in FIG. 8 and FIG. 9, which is further connected to the back end 20 of an access station 3. Thus, the conveyors of the relay modules 43 may form a continuous conveyor 16,17 with the entry conveyor 8 and exit conveyor 9 of an access station 3.

An order container conveyor with a plurality of order containers is illustrated in FIG. 8 and FIG. 9 passing by the access station, such that storage goods may be picked between the order containers and the storage containers. Although exemplified as order containers herein, the containers and conveyor in FIG. 8 and FIG. 9 may be storage containers and a storage conveyor leading e.g. to another automated storage and retrieval system.

In FIG. 8, a picking person is illustrated picking from a tilted storage container in the picking zone of the access station. Meanwhile, the robotic picker, exemplified as a three-axis gantry robot, is shown extending over the order container conveyor and the access station, with its picking arm idle.

FIG. 9 illustrates a similar robotic picker as in FIG. 8, however, the picking person is not present. Thus, the storage container in the picking zone of the access container is not tilted, as the robotic picker does not have the same ergonomic concerns as a human picker. Indeed, for a robotic picker with a vertical reach, an un-tilted container will be easier to pick from when reaching from above. In the preceding description, various aspects of an access station according to the invention have been described with reference to the illustrative embodiments. However, this description is not intended to be construed in a limiting sense. Various modifications and variations of the illustrative embodiments, as well as other embodiments of the system, which are apparent to persons skilled in the art, are deemed to lie within the scope of the present invention as defined by the following claims.

The present invention is particularly suited for automated storage systems where the storage containers are of varying depth. The tilting device makes it possible to ensure that the storage container is pushed all the way up, so it touches the panels around the picking zone regardless of the depth of the storage container. This makes it impossible for a person to get his or her hand inside the picking station when they are working.

| Reference numerals: | |
| --- | --- |
| 1 | Automated storage and retrieval system |
| 3 | Access station |
| 4 | Picking zone |
| 5 | Sliding door |
| 6 | Entry position |
| 7 | Exit position |
| 8 | Entry conveyor |
| 9 | Exit conveyor |
| 10 | Entry conveyor transport direction |
| 11 | Exit conveyor transport direction |
| 12 | Access conveyor transport direction |
| 13 | Tilting device |
| 14 | Robotic picker |
| 15 | Transfer position |
| 16 | First storage system conveyor |
| 17 | Second storage system conveyor |
| 19 | Front end of access station |
| 20 | Back end of access station |
| 21 | Centre access conveyor |

| Reference numerals: | |
| --- | --- |
| 22 | Lateral access conveyor |
| 23 | Top panel |
| 23' | Tilted top panel |
| 24 | Front panel |
| 24' | Tilted front panel |
| 25 | Side panel |
| 26 | Control panel/emergency stop button |
| 27 | Adjustable feet |
| 28 | Transport belt |
| 29 | Roller conveyor |
| 30 | Roller conveyor frame |
| 31 | Belt driving motor |
| 32 | Tilting motor |
| 33 | Sliding frame |
| 34 | Rod for tilting |
| 35 | Centre access conveyor frame |
| 36 | Protective panel |
| 39 | Forward guide rail |
| 40 | Lateral access conveyor frame |
| 43 | Relay module |
| 44 | Transport direction of storage containers in relay modules |
| 45 | Picking person |
| 46 | Order containers |
| 100 | Framework structure |
| 102 | Upright members of framework structure |
| 103 | Horizontal members of framework structure |
| 104 | Storage grid |
| 105 | Storage column |
| 106 | Storage container |
| 106' | Particular position of storage container |
| 107 | Stack |
| 108 | Rail system |
| 110a | First neighboring rail of first set |
| 110b | Second neighboring rail of first set |
| 111 | Second set of parallel rails in second direction (Y) |
| 111a | First neighboring rail of second set |
| 111b | Second neighboring rail of second set |
| 110a | First neighboring rail of first set |
| 115 | Grid opening |
| 119 | Delivery column |
| 120 | Delivery column |
| 122 | Grid cell |
| 140 | Delivery system |
| 200 | First container handling vehicle |
| 201 | Wheel arrangement |
| 202, 202' | Container handling vehicle footprint |
| 300 | Second container handling vehicle |
| 301 | Wheel arrangement |
| X | First direction |
| Y | Second direction |
| P | Horizontal plane of rail system |
| Wo | Width of grid opening |
| Wc | Width of grid cell |
| Lo | Length of grid opening |
| Lc | Length of grid cell |

The invention claimed is:

1. An access station for picking storage containers, comprising:
a picking zone,
at least one conveyor arranged to transport storage containers from an entry position through said picking zone and to an exit position,
at least one tilting device arranged to tilt a storage container at least in the picking zone, characterized in that the access station further comprises: a top panel, a tilted top panel, a front panel, a tilted front panel and side panels forming an outer housing, the panels has an aperture with a sliding door in the picking zone.

2. The access station according to claim 1, where the entry position and the exit position are arranged for connection to at least one storage system conveyor.

3. The access station according to claim 1, wherein the access station comprises only one tilting device arranged to tilt at least one storage container in the picking zone.

4. The access station according to claim 1, wherein the picking zone is arranged to receive only one storage container.

5. The access station according to claim 1, wherein the tilting device is arranged to tilt only one storage container.

6. The access station according to claim 1, comprising three tilting devices.

7. The access station according to claim 1, wherein the access station comprises an entry conveyor arranged to transport storage containers from the entry position to at least one access conveyor, and an exit conveyor arranged to transport storage containers from the at least one access conveyor to the exit position.

8. The access station according to claim 7, wherein a transport direction of the entry conveyor is parallel and opposite to a transport direction of the exit conveyor, and wherein a transport direction of the at least one access conveyor is orthogonal to the transport directions of the entry and exit conveyors.

9. The access station according to claim 8, wherein the tilting device is arranged to tilt around an axis parallel to a transport direction of the at least one access conveyor.

10. The access station according to claim 1, wherein the picking zone is arranged towards a front side of the access station, and where the access station is arranged to receive a goods conveyor between the picking zone and a back side of the access station.

11. A method for operating an access station according to claim 1, wherein the method comprises the steps of:
receiving a storage container at the entry position,
transferring the storage container from the entry position to the picking zone,
tilting the storage container with a tilting device,
transferring the storage container from the picking zone to the exit position,
delivering a storage container at the exit position.

12. An automated storage and retrieval system, the automated storage and retrieval system comprising:
a rail system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks;

a plurality of stacks of storage containers arranged in storage columns located beneath the rail system, wherein each storage column is located vertically below a grid opening;

a plurality of container handling vehicles for handling storage containers in the automated storage and retrieval system, each vehicle being configured to move on the rail system above the storage columns, each vehicle comprising a vehicle body; and a wheel assembly connected to the vehicle body, the wheel assembly being configured to guide the vehicle along the rail system in at least one of the first direction and the second direction;

an access station comprising:

a picking zone, at least one storage conveyor arranged to transport storage containers from an entry position through said picking zone and to an exit position, and at least one tilting device arranged to tilt a storage container at least in the picking zone, characterized in that the access station further comprises: a top panel, a tilted top panel, a front panel, a tilted front panel and side panels forming an outer housing, the panels having an aperture with a sliding door in the picking zone; and at least one storage system conveyor arranged below at least one delivery column, wherein the at least one storage system conveyor is arranged to transfer storage containers between a transfer position below the at least one delivery column and the entry position of the access station, and between the transfer position and the exit position of the access station.

* * * * *